US011853859B2

(12) United States Patent
Agrawal et al.

(10) Patent No.: US 11,853,859 B2
(45) Date of Patent: Dec. 26, 2023

(54) TACKLING DELAYED USER RESPONSE BY MODIFYING TRAINING DATA FOR MACHINE-LEARNED MODELS (71) Applicant: Microsoft Technology Licensing, LLC, Redmond, WA (US)

(72) Inventors: Parag Agrawal, Sunnyvale, CA (US); Aastha Jain, Sunnyvale, CA (US); Ashish Jain, Santa Clara, CA (US); Divya Venugopalan, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 898 days.

(21) Appl. No.: 16/866,794

(22) Filed: May 5, 2020

(65) Prior Publication Data
US 2021/0350284 A1    Nov. 11, 2021

(51) Int. Cl.
G06N 3/045    (2023.01)
G06N 20/20    (2019.01)
G06F 18/214   (2023.01)
G06F 18/2113  (2023.01)

(52) U.S. Cl.
CPC ........... *G06N 3/045* (2023.01); *G06F 18/214* (2023.01); *G06F 18/2113* (2023.01); *G06N 20/20* (2019.01)

(58) Field of Classification Search
CPC .. G06N 3/00; G06N 3/02; G06N 3/04; G06N 3/045; G06N 20/00; G06N 20/10; G06N 20/20; G06F 18/2113; G06F 18/214
See application file for complete search history.

(56) References Cited

U.S. PATENT DOCUMENTS

2021/0117773 A1* 4/2021 Sollami ................. G06N 3/084

FOREIGN PATENT DOCUMENTS

WO    WO-2015191368 A1 * 12/2015  ..... G06Q 10/063118

* cited by examiner

*Primary Examiner* — Shane D Woolwine
(74) *Attorney, Agent, or Firm* — NICHOLSON DE VOS WEBSTER & ELLIOTT LLP (57) ABSTRACT Techniques for tackling delayed user response by modifying training data for machine-learned models are provided. In one technique, a first machine-learned model generates a score based on a set of feature values. A training instance is generated based on the set of feature values. An attribute of the training instance is modified based on the score to generate a modified training instance. The attribute may be an importance weight of the training instance or a label of the training instance. The modified training instance is added to a training data. One or more machine learning techniques are used to train a second machine-learned model based on the training data.

20 Claims, 4 Drawing Sheets

TACKLING DELAYED USER RESPONSE BY MODIFYING TRAINING DATA FOR MACHINE-LEARNED MODELS

TECHNICAL FIELD

The present disclosure relates generally to machine learning and, more particularly to, modifying training data to account for delay in usage data.

BACKGROUND

Machine learning is the scientific study of algorithms and statistical models that computer systems use to perform a specific task without using explicit instructions, relying on patterns and inference instead. Machine learning algorithms build a mathematical model based on sample data, known as "training data," in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

Some machine-learned models are trained using training data that has been generated based on usage data that reflects user (e.g., online) actions. For example, a connection network recommendation system may recommend, to a website visitor, one or more users with whom the visitor may wish to connect in an online network. The recommendation system relies on one or more machine-learned models that have been trained based on past recommendations to other website visitors and how those website visitors reacted to the past recommendations, such as accepting, declining, or otherwise ignoring.

A significant challenge is that some user responses are only observed after a long and seemingly random delay. For example, visitor (or "viewer") sends an invitation to connect to another person (or "destination") which can be accepted by the destination at any point of time. The accepted invitation is a delayed user response and is treated as a positive label for training a machine-learned model. Delayed positive labels pose two major challenges: (1) incomplete labels and (2) suboptimal machine-learned model. First, regarding incomplete labels in the continuous training of machine-learned models, "fresh" data may not have complete label information (as the labels are delayed) at the time the label data is ingested by the machine learning training algorithm. Second, regarding a suboptimal model, in order to avoid the problem of (1) incomplete labels, unaccepted invitations are treated as a negative label until the invitation is accepted. Such a naive strategy underestimates the acceptance rate of invitations, resulting in suboptimal performance of the machine-learned model.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

A system and method for modifying training data used to train a machine-learned model are provided. In one technique, a first machine-learned model computes a score for a first entity (or first entity pair). The score may be used to rank a content item associated with the first entity relative to content items associated with other entities. A training instance is generated for the first entity. The training instance has a negative label without waiting for the first entity to respond or perform some action. An importance weighting for the training instance is determined based on the score. The training instance is used to train a second machine-learned model, which may be based on the same features as the first machine-learned model.

Embodiments improve computer technology by avoiding (1) staleness in the machine-learned model (which would have resulted from not relying on new data) and (2) incomplete label data. Previously, training a model would have had to wait for the passage of a significant period of time (e.g., a couple weeks) in order to obtain the label data before the model could be trained. Even if a significant amount of time elapses before training the model, there is no guarantee that all applicable events have been received and processed, since a positive event can arrive at any point. Such disadvantages are overcome by modifying a loss function using importance weighting. The modified loss function corrects the discrepancy in labeled data brought by delayed user responses.

For example, given the example above where a viewer sends an invitation to connect to an invitee (who can use a computing device to electronically accept the invitation at any point of time), an initial machine-learned model is used to generate a score representing a likelihood that the invitee will accept an invitation from the viewer. The higher the score, the more likely the system will cause data about the invitee to be presented as a candidate invitee on a computing device of the viewer. Once the invitation is sent based on input from the viewer, instead of using the unaccepted invitation as a negative training instance while the invitee has not viewed the invitation or is deliberating whether to accept the invitation, the score is used to generate an importance weight for the training instance when training a subsequent machine-learned model, which may be an update to the initial machine-learned model. Thus, different training instances corresponding to different viewer-invitee pairs (but the same viewer) may have different importance weights, depending on the corresponding scores produced by the initial machine-learned model.

System Overview

Figure 1:
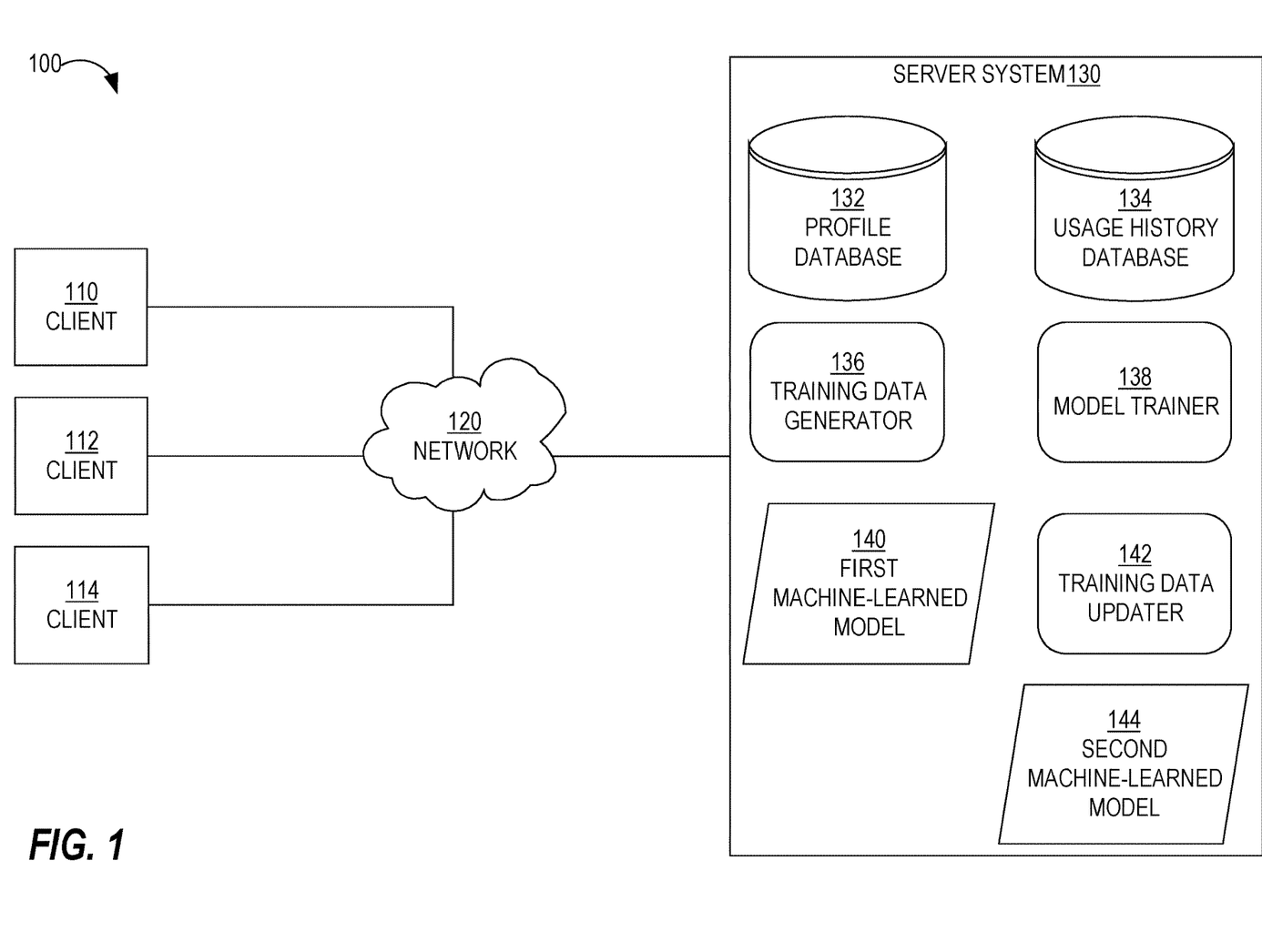
FIG. 1 is a block diagram that depicts an example system for training machine-learned models, in an embodiment.

FIG. 1 is a block diagram that depicts an example system 100 for training machine-learned models, in an embodiment. System 100 includes clients 110-114, network 120, and server system 130.

Each of clients 110-114 is an application or computing device that is configured to communicate with server system 130 over network 120. Examples of computing devices include a laptop computer, a tablet computer, a smartphone, a desktop computer, and a personal digital assistant (PDA). An example of an application includes a native application that is installed and executed on a local computing device and that is configured to communicate with server system 130 over network 120. Another example of an application is a web application that is downloaded from server system 130 and that executes within a web browser running on a computing device. Each of clients 110-114 may be implemented in hardware, software, or a combination of hardware and software. Although only three clients 110-114 are depicted, system 100 may include many more clients that interact with server system 130 over network 120.

Network 120 may be implemented on any medium or mechanism that provides for the exchange of data between clients 110-114 and server system 130. Examples of network 120 include, without limitation, a network such as a Local Area Network (LAN), Wide Area Network (WAN), Ethernet or the Internet, or one or more terrestrial, satellite or wireless links.

Server system 130 includes a profile database 132, usage history database 134, a training data generator 136, a model trainer 138, a first machine-learned model 140, a training data updater 142, and a second machine-learned model 144. While only two machine-learned models are depicted, server system 130 may include more than two machine-learned models. Training data generator 136, model trainer 138, and training data updater 142 may be implemented in software, hardware, or any combination of software and hardware. Each of these elements of server system 130 is described in more detail herein and may be implemented in hardware, software, or a combination of hardware and software.

Although depicted as a single element, server system 130 may comprise multiple computing elements and devices, connected in a local network or distributed regionally or globally across many networks, such as the Internet. Thus, server system 130 may comprise multiple computing elements other than the depicted elements.

Profile Database

Profile database 132 stores multiple entity profiles. Each entity profile in profile database 132 is provided by a different user. Example entities include users, groups of users, and organizations (e.g., companies, associations, government agencies, etc.). Each entity profile is provided by a different user or group/organization representative. An organization profile may include an organization name, a website, one or more phone numbers, one or more email addresses, one or more mailing addresses, a company size, a logo, one or more photos or images of the organization, an organization size, and a description of the history and/or mission of the organization. A user profile may include a first name, last name, an email address, residence information, a mailing address, a phone number, one or more educational/ academic institutions attended, one or more academic degrees earned, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, private messages between the user and other users in the user's social network, and public messages that the user posted and that are visible to users outside of the user's social network (but that are registered users/members of the social network provider).

Some data within a user's profile (e.g., work history) may be provided by the user while other data within the user's profile (e.g., skills and endorsement) may be provided by a third party, such as a "friend," connection, colleague of the user.

Server system 130 may prompt users to provide profile information in one of a number of ways. For example, server system 130 may have provided a web page with a text field for one or more of the above-referenced types of information. In response to receiving profile information from a user's device, server system 130 stores the information in an account that is associated with the user and that is associated with credential data that is used to authenticate the user to server system 130 when the user attempts to log into server system 130 at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, server system 130 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically by server system 130 (or another automatic process). For example, a user specifies, in his/her profile, a name of the user's employer. Server system 130 determines, based on the name, where the employer and/or user is located. If the employer has multiple offices, then a location of the user may be inferred based on an IP address associated with the user when the user registered with a social network service (e.g., provided by server system 130) and/or when the user last logged onto the social network service.

While many examples herein are in the context of online social networking, embodiments are not so limited.

Usage History Database

Usage history database 134 stores data about usage history, which reflects interactions by one or more entities (e.g., users) with one or more (digital) content items. Examples of content items includes messages (such as connection invitations), notifications of events, and advertisements. Examples of interactions with content items include generating (or causing them to be generated), uploading (or causing them to be uploaded), sending content items (or causing them to be sent), selecting (such as clicking with a cursor control device or with a finger on a touchscreen display), viewing (such as viewing a content item for more than two seconds), liking, sharing, and commenting.

A record may be created and stored for each entity interaction with a content item. A record may include a creator identifier (that identifies an entity who created the content item), a source entity identifier (that identifies an entity who causes the content item to be sent or transmitted to another entity), a timestamp of when the content item was interacted with, a destination entity identifier (that identifies an entity who is the target, or intended recipient, of a content item), software product identifier (that identifies a software product that was used to generate the content item), a model identifier (that identifies a (e.g., machine-learned) model that generated a score of the content item), a score of the content item, an indication of whether the destination entity interacted with the content item, and/or when such a destination entity interacted with the content item.

Machine Learning

In an embodiment, one or more machine-learned models are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with users and regions. The statistical model is trained based on multiple attributes (or factors) described herein. In machine learning parlance, such attributes are referred to as "features." To generate and train a statistical prediction model, a set of features is specified and a set of training data is identified.

Embodiments are not limited to any particular machine learning technique for training or generating a machine-learned model. Example machine learning techniques include linear regression, logistic regression, random forests, naive Bayes, neural networks, and Support Vector Machines (SVMs). Advantages that machine-learned models have over rule-based models include the ability of machine-learned prediction models to output a probability (as opposed to a number that might not be translatable to a probability), the ability of machine-learned prediction models to capture non-linear correlations between features, and the reduction in bias in determining weights for different features.

A machine-learned model may output different types of data or values, depending on the input features and the training data. Training data comprises multiple training instances. Each training instance corresponds to a different event of a particular type in a set of one or more types, such as a user selection (e.g., click) of a certain type of content item (e.g., a connection invite). Each training instance comprises multiple feature values, each corresponding to a different feature. Example features include the user profile features (such as from profile database 132), such as current and past job titles, current and past job functions, current and past job industries, number of years of work experience, names of current and past employers, list of skills, number of connections in an online social network, etc. The user profile features may be of a single user or multiple users, such as an inviter (or someone who initiates a connection invitation) and an invitee (or someone who receives a connection invitation). Other example features include usage history features (such as from usage history database 134).

In order to generate the training data, information about a user (or entity) or multiple users is analyzed to compute the different feature values. The label (corresponding to the dependent variable) of each training instance may be whether the user performed a certain action, such as selecting (e.g., clicking on) certain content, which may correspond to accepting an invitation to connect online with another user. The label information may be determined from usage history database 134.

Initially, the number of features that are considered for training may be significant. After training a prediction model and validating the prediction model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training and invoking future models.

Embodiments are not limited to the set of features upon which a machine-learned model is based or what is being predicted.

Training

Training data generator 136 generates training data based on profile database 132 and/or usage history database 134. The training data comprises multiple training instances. Some of the training instances may be negative training instances, indicating that the destination entity, or intended recipient, has not performed a particular action yet, such as accepting a corresponding connection invitation. Some of the training instances may be positive training instances, indicating that the destination entity, or intended recipient, has performed the particular action, such as accepting a corresponding connection invitation. Initially, the training instances in the training data might not have any importance weights when model trainer 138 trains first machine-learned model 140 based on the training data. Alternatively, training data generator 136 generates importance weights for at least a portion of the training instances.

Importance Weights

An importance weight of a training instance influences the training of the resulting machine-learned model. The higher the importance weight of a training instance, the greater the influence the training instance will have on the machine-learned model. Conversely, the lower the importance weight of a training instance, the lesser the influence the training instance will have on the machine-learned model. The "influence" of a training instance is reflected in the extent to which one or more coefficients of one or more features of the machine-learned model are modified as a result of training the model based on the training instance. A higher importance weight causes the coefficients to change more significantly than a lower importance weight.

Adjusting Importance Weights

In an embodiment, a score generated by one machine-learned model is used to adjust or modify an importance weight of a training instance that is used to train another machine-learned model. (Both machine-learned models may have identical feature sets. Alternatively, the feature sets of each machine-learned model may be different.) A default value of an importance weight of a training instance may be one.

The value of the importance weight of a training instance may depend on how the training instance is classified or what the label is of the training instance. For example, in a binary classification scenario where a label is either positive (e.g., 1) or negative (e.g., 0), the value of the importance weight may be different depending on the label. For example, for negative training instances (e.g., where the label is 0), the importance weight is a product of: (A) a summation of the score plus a first positive value (e.g., 1) and (B) a difference between a second positive value (e.g., 1) and the score. In mathematical terms, the importance weight for negative labels is $(1+f(x))*(1-f(x))$, where $f(x)$ is the score of machine-learned model f, and x is the feature set that was used to produce the score.

For positive training instances (e.g., where the label is 1), the importance weight is a summation of the score plus a positive value (e.g., 1). In mathematical terms, the importance weight for negative labels is $1+f(x)$, where $f(x)$ is the score of machine-learned model f, and x is the feature set that was used to produce the score. Thus, for both positive and negative training instances, importance weights may be non-integer values.

The importance weights for positive and negative training instances may be determined according to the following mathematical details.

Process for Determining Formula for Importance Weights

In order to arrive at these specific examples of how to compute importance weights, x represents features (or covariates) and $f_\theta$ represents a nonlinear parametric function, which is used to predict the probability of a certain action, such as accepting a connection invite. The estimated function $\hat{f}_\theta$ may be any function, an example of which is a deep-and-wide neural network. Further, y represents the response variable (e.g., probability of acceptance of a connection invite). A goal is to estimate the unknown parametric function in the following equation:

$$y|x \sim f_\theta(y|x) \quad (1)$$

where, y=1 if a connection invite is accepted, $f_\theta$ is the unknown parametric function to be estimated, and x is the set of features. From this point onwards, $f_\theta(x)$ is used to refer to $f_\theta(y=1|x)$ for brevity.

A deep-and-wide neural net (NN) model in equation (1) can be denoted as, $$f_\theta(x) = \sigma(w^T_{wide}x + w^T_{deep}\alpha^{(l)} + \beta) \quad (2)$$

where,
σ=sigmoid function,
$w^T_{wide}$=unknown weights for the features in wide part,
x are the set of features,
$w^T_{deep}$=unknown weights for the deep component,
$\alpha^{(l)}$=final layer activations of the deep component,
β=intercept.

Figure 2:
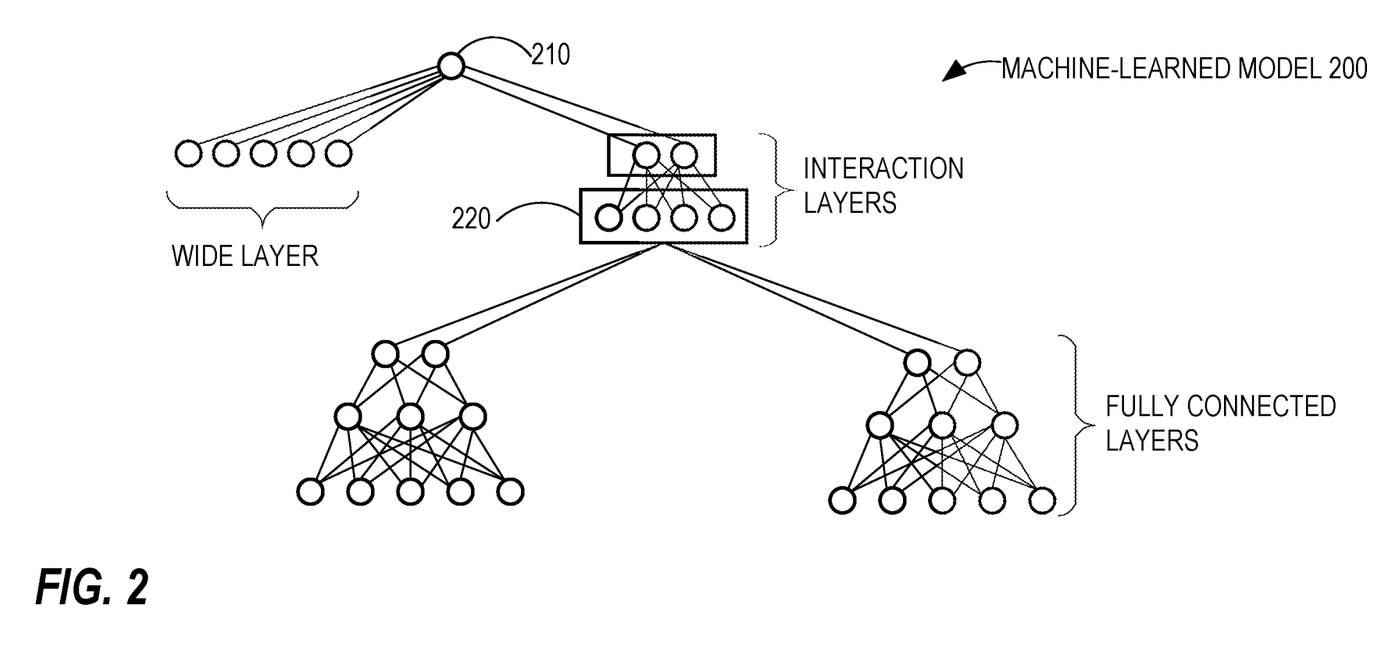
FIG. 2 is a block diagram that depicts an example neural network, in an embodiment.

An example of a deep and wide machine-learned model 200 is depicted in FIG. 2.

The deep part of model 200 is a two tower neural network (e.g., one tower for the source user (or inviter) and one tower for the target user (or invitee)), where each tower has two fully connected layers. The outputs of these two towers go into a Hadamard or cosine interaction layer 220, which is then added as a feature along with the other features in the wide part. Finally, in the response layer 210, a sigmoid activation function is applied or invoked to generate the probability of accepting a connection invitation.

To formulate the new loss function which would be used to train $f_\theta$, two assumptions are made. If b is the biased observed distribution and p is the true data distribution, then the assumptions are as follows:
1. $b(x|y=1)=p(x|y=1)$ which means for positive labels the conditional biased and true data distributions are same,
2. $b(x\ y=0)=p(x)$ which means for negative labels, the conditional biased distribution is the same as unconditional true distribution. This is reasonable to assume since in social network recommender systems, due to sparse & delayed positive labels, most of the samples are negatively labeled.

Also, $b(y=0)=1/(1+p(y=1))$, since samples are initially labeled as negative, until the invitation is accepted.

Given these assumptions, a new loss function may be derived as follows. The following equation reflects a typical cross-entropy loss function that is used to train a deep-and-wide model:

$$L(\theta) = -E_p[\log f_\theta(x)] \quad (3)$$

$$-\sum_{k,y} p(y=1|x)\log f_\theta(x) + p(y=0|x)\log f_\theta(y=0|x)$$

$$= -\sum_{k,y} b(y=1|x)\frac{p(y=1|x)}{b(y=1|x)}\log f_\theta(x) +$$

$$b(y=0|x)\frac{p(y=0|x)}{b(y=0|x)}\log f_\theta(y=0|x)$$

The biased probability of observing a positive label (e.g., an acceptance of a connection invitation) is:

$$b(y=1|x) = \frac{b(y=1)b(x|y=1)}{b(y=1)b(x|y=1) + b(y=0)b(x|y=0)}.$$

Assigning $k=1/(1+p(y=1))$ and using the two assumptions stated above, $b(y=1|x)$ can be rewritten as follows:

$$b(y=1|x) = \frac{k.p(y=1)p(x|y=1)}{k.p(y=1)p(x|y=1) + k.p(x)} \quad (4)$$

$$= \frac{p(x)p(y=1|x)}{p(x)p(y=1|x) + p(x)}$$

$$= \frac{p(y=1|x)}{1 + p(y=1|x)}$$

Similarly, $$b(y=0|x) = 1 - b(y=1|x) = \frac{1}{1 + p(y=1|x)} \quad (5)$$

Substituting, equations (4) and (5) in equation (3) gives the following new loss function:

$$L_{new}(\theta) = -\sum_{x,y} b(y=1|x)(1 + p(y=1|x))\log f_\theta(x) +$$

-continued $$b(y=0\mid x)p(y=0\mid x)(1+p(y=1\mid x))\log f_\theta(y=0\mid x)$$

$$=-\sum_{x,y}(1+p(y=1\mid x))b(y=1\mid x)\log f_\theta(x)+$$

$$(1-p(y=1\mid x))(1+p(y=1\mid x))$$

$$b(y=0\mid x)\log f_\theta(y=0\mid x)$$

This new loss function, when compared to a typical cross-entropy loss function, is weighing positive labels with $(1+p(y=1|x))$ and negative labels with $(1-p(y=1|x))(1+p(y=1|x))$. Since p is not known, p may be replaced with the model $f_\theta$, which means the weight for positive labels is $1+f_\theta(x)$ and the weight for negative labels is $(1+f_\theta(x))(1-f_\theta(x))$. This replacement works since $f_\theta$ converges to p.

After first machine-learned model 140 (e.g. corresponding to $f_\theta$) is leveraged to generate scores for different usage instances, new training instances may be generated (e.g., by training data generator 136), one training instance for each usage instance. An example of a usage instance is the sending of a connection invitation to a destination entity. Other examples of usage instances include a source entity sending an electronic message to (e.g., an account of) a destination entity and a notification system automatically sending a notification to (e.g., a computing device of) a destination entity.

Training Data Process Overview

Figure 3:
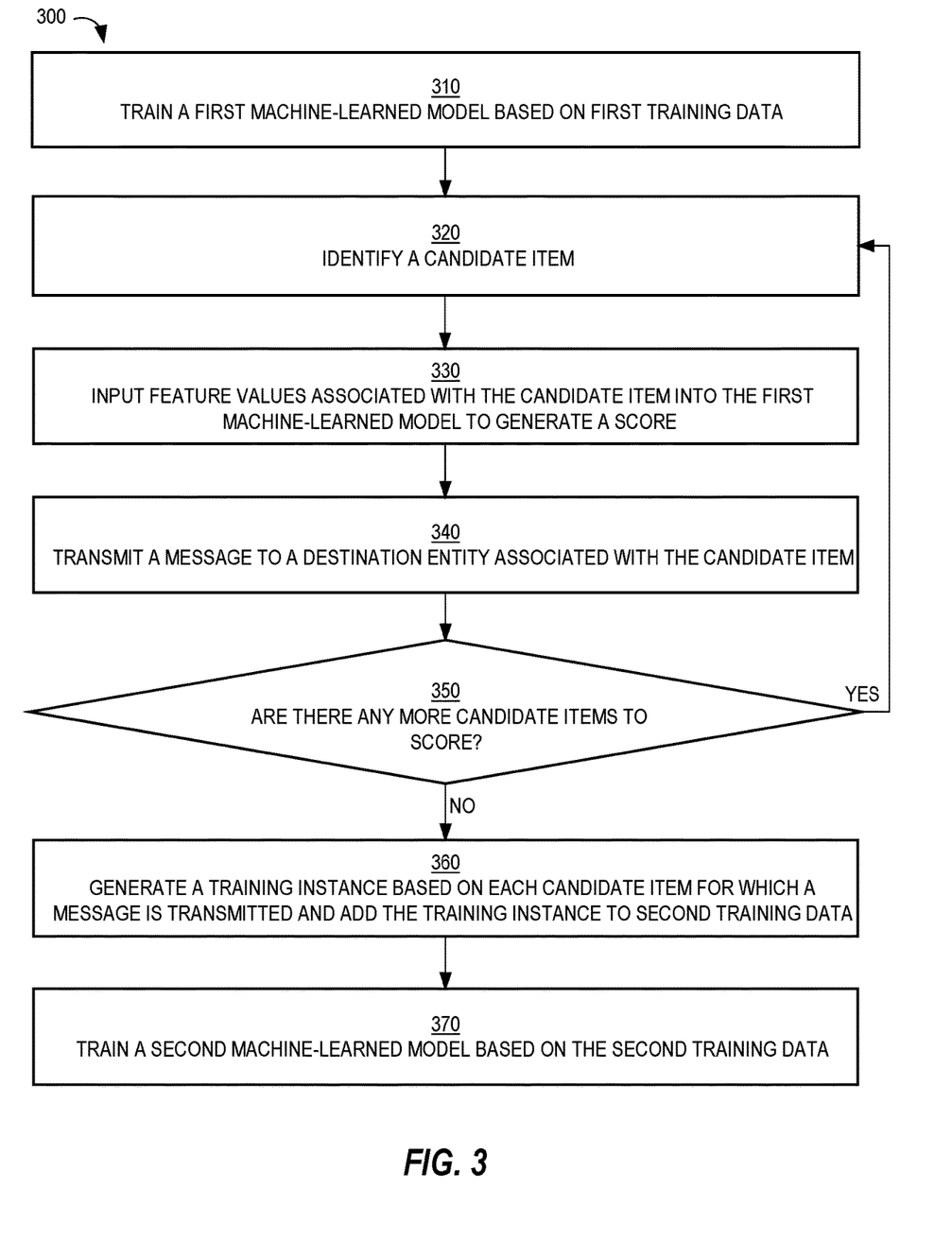
FIG. 3 is a flow diagram that depicts an example process for training a new machine-learned model based on scores of previous scored items, in an embodiment.

FIG. 3 is a flow diagram that depicts an example process 300 for training a new machine-learned model based on scores of previous scored items, in an embodiment. Process 300 may be performed by different elements of server system 130.

At block 310, a first machine-learned model (e.g., first machine-learned model 140) is trained based on first training data. Block 310 may be performed by model trainer 138. Training instances in the first training data may or may not have importance weights associated therewith. One or more machine learning techniques are used to train the model.

At block 320, a candidate item is identified. A candidate item may be associated with a single entity or multiple entities. For example, a candidate item may correspond to a user, a pair of users, a content item, a pair of content items, or a user-content item pair. For example, a candidate item may correspond to a particular user, but, in generating a score for the candidate item, not only are features of the particular user taken into account, features of a viewing user (who is different than the particular user) and, optionally, features of the viewing context (e.g., time of day, day of week, type of computing device of the viewing user, type of operating system of the computing device, features of a webpage that the viewing user is viewing or requesting) are also taken into account. The set of feature values associated with a candidate item is referred to as a feature value set.

At block 330, The feature value set associated with the candidate item is input into the first machine-learned model, which generates a score for the candidate item. Again, features associated with a candidate item may include features of the candidate item itself, features of the destination entity, features of the context, and features of the source entity (if any).

At block 340, a message is transmitted to a destination entity. The message includes data about or is otherwise associated with the candidate item. Block 340 may involve transmitting the message over a computer network to a computing device of the destination entity, transmitting an email message to an email account of the destination entity, or updating an account of the destination entity to include the message.

The decision to transmit the message may have been automatically based on the score. Alternatively, the decision to transmit the message may have been based on user input, such as a viewing user that is presented the candidate item. In the latter case, the score may have been used to determine whether to present the candidate item to the viewing user, after which the viewing user provided input that selects the candidate item.

Block 340 may also involve generating and storing event data that indicates that the message was transmitted to the destination entity. The event data may be stored in a persistent event log that records such events.

At block 350, it is determined whether there are any more candidate items to score. If so, process 300 returns to block 320, where another candidate item is identified. Otherwise, process 300 proceeds to block 360. Block 350 may be performed before block 340. For example, multiple candidate items are identified and scored and, based on all the scores of those candidate items, it is determined whether any, or how many, messages will be transmitted to destination entities.

At block 360, a training instance is generated based on each candidate item for which a message is transmitted and is added to second training data, which may initially be empty upon the first iteration of block 360. Block 360 may be performed by training data generator 136. A label for the training instance may indicate that the corresponding destination entity did not provide certain input (e.g., a selection, a sign-up, etc.). However, a weight for the training instance is based on the score generated for the corresponding candidate item. Block 360 may be performed without waiting for a response from the destination entity. Also, block 360 may be performed immediately after block 330 or block 340.

At block 370, a second machine-learned model (e.g., second machine-learned model 144) is trained based on second training data. The second machine-learned model may be considered a different (updated) version of the first machine-learned model. Block 370 may be performed by model trainer 138. The same machine learning techniques may be used to train the second model as the first model. Also, both models may be based on the same features.

Updating Training Instance

After a message is transmitted to a destination entity, the destination entity may perform a certain action. For example, the destination entity (operating a computing device) may click on the message (e.g., indicating acceptance of a connection invitation) as it is displayed on a screen of the computing device, click on a particular graphical element of the message (e.g., a comment or share button), or perform another action after viewing the message (e.g., sign-up for a newsletter or making a particular purchase). If the action is classified as a positive, then an event is generated.

The event causes a training instance that corresponds to that destination entity to be updated. For example, a destination entity (or user) of client 110 selects a connection invitation by selecting a graphical button adjacent to the connection invitation. Selection of that graphical button causes an event message to be transmitted to server system 130. The event message includes a destination entity identifier that uniquely identifies the destination entity, a source entity identifier that uniquely identifies the source entity (e.g., who may have selected the corresponding candidate item), a message type identifier that indicates a type of message that was transmitted to the destination entity (e.g., connection invitation in this case), a message/invitation identifier (e.g., that uniquely identifies the message/invitation that was sent to the destination entity), a timestamp of the user selection (e.g., acceptance of the connection invitation), a session identifier that identifies a user session (of the source entity) in which the message was generated and transmitted to the destination entity, a content item selection event identifier that uniquely identifies a content item selection event where multiple candidate items were considered and scored and a subset was selected for presentation, a product identifier that identifies a software product that was used to generate a score for the corresponding candidate item, and/or a model identifier that identifies a (e.g., machine-learned) model that generated the score for the corresponding candidate item. A model identifier may be unnecessary if the software product only uses a single model.

Server system 130 stores the event message in usage history database 134. Usage history database 134 may store event messages corresponding to many different models and many different software products.

Training data updater 142 reviews usage history database 134 and, for each event message, determines whether there is a corresponding training instance to update. For example, for each event message, training data updater 142 identifies a model identifier, identifies a data set (e.g., a table or partition) (associated with the model identifier) where training instances are stored for the corresponding model, and identifies a matching training instance in the data set. A matching training instance may be one that satisfies one or more criteria of the event message. For example, both the training instance and the event message include the same content item selection event identifier. As another example, both the training instance and the event message include the same destination entity identifier, source entity identifier, and session identifier.

Once a matching training instance is identified for an event message, training data updater 142 updates the training instance in one or more ways. For example, training data updater 142 changes the label of the training instance from a negative label (e.g., 0) to a positive label (e.g., 1). Updating the training instance may also involve changing the importance weight. For example, training data updater 142 changes the importance weight from its current importance weight to $(1+f_\theta(x))$. The original (or previous) importance weight may be 1 or $(1+f_\theta(x))(1-f_\theta(x))$.

Therefore, a negative training instance may be used to train a first version of a machine-learned model, the negative training instance is changed to a positive training instance with an updated importance weight, and the positive training instance then used to train a second version of the machine-learned model (e.g., second machine-learned model 144).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
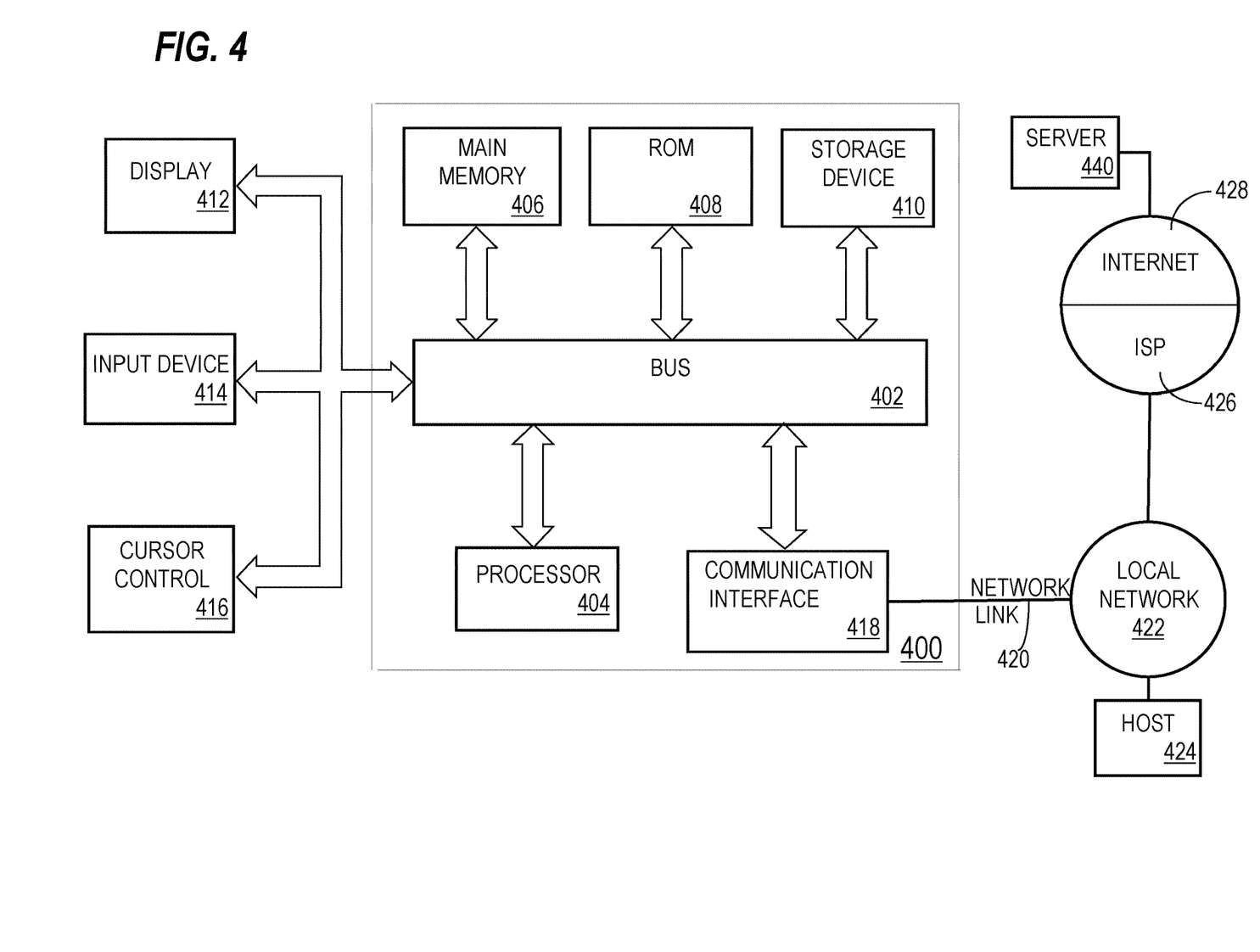
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    for each feature value set in a plurality of feature value sets:
        using a first machine-learned model to generate a score based on said each feature value set;
        generating a training instance based on said each feature value set;
        modifying an attribute of the training instance based on the score to generate a modified training instance;
        adding the modified training instance to training data;
    using one or more machine learning techniques to train a second machine-learned model based on the training data;
    wherein the method is performed by one or more computing devices.

2. The method of claim 1, wherein modifying the attribute of the training instance comprises modifying a weight of the training instance based on the score, wherein the weight of the training instance affects how much one of the one or more machine learning techniques modifies one or more coefficients of the second machine-learned model.

3. The method of claim 1, wherein modifying the attribute of the training instance comprises:
    identifying a label of the training instance;
    determining whether the label is a positive label or a negative label;
    in response to determining that the label is a positive label, replacing an attribute value of the attribute with a summation of the score and a positive value.

4. The method of claim 1, wherein modifying the attribute of the training instance comprises:
    identifying a label of the training instance;
    determining whether the label is a positive label or a negative label;
    in response to determining that the label is a negative label, replacing an attribute value of the attribute with a product of (1) a summation of the score and a first positive value and (2) a difference between a second positive value and the score.

5. The method of claim 1, wherein modifying the attribute of the training instance comprises:
    identifying a label of the training instance;
    determining whether the label is a positive label or a negative label;

if the label is a positive label, then replacing an attribute value of the attribute with a summation of the score and a positive value;
if the label is a negative label, then replacing the attribute value of the attribute with a product of (1) a summation of the score and the positive value and (2) a difference between the positive value and the score.

6. The method of claim 1, further comprising:
storing event data that indicates that certain data is made available to a particular destination entity;
without waiting for a response from the particular destination entity and based on the event data:
 generating a particular training instance that includes a first label that indicates that the particular destination entity did not perform an action in response to the certain data;
 adding the particular training instance to the training data prior to training the second machine-learned model.

7. The method of claim 6, further comprising, after training the second machine-learned model:
determining that the particular destination entity performed the action in response to the certain data;
in response to determining that the particular destination entity performed the action in response to the certain data, updating the particular training instance to generate an updated training instance by replacing the first label with a second label that indicates that the particular destination entity performed the action in response to the certain data;
adding the updated training instance to the training data.

8. The method of claim 7, wherein:
the particular training instance is associated with a first weight that is based on a particular score computed by the first machine-learned model for a particular feature value set;
the updated training instance is associated with a second weight that is different than the first weight and that is based on the particular score.

9. The method of claim 1, wherein each feature value set in the plurality of feature value sets includes a first set of feature values pertaining to one entity and a second set of feature values pertaining to another entity.

10. A method comprising:
using a first machine-learned model to generate a score based on a set of feature values pertaining to a first entity;
generating a training instance that includes a negative label;
modifying a weight of the training instance based on the score to generate a modified training instance;
using one or more machine learning techniques to train a second machine-learned model based on the training instance;
wherein the method is performed by one or more computing devices.

11. The method of claim 10, further comprising:
storing event data that indicates that certain data is made available to a second entity;
wherein generating the training instance is performed without waiting for a response from the second entity and based on the event data;
wherein the training instance includes a label that indicates that the second entity did not perform an action in response to the certain data;
prior to training the second machine-learned model, adding the training instance to training data that includes a plurality of training instances, wherein the second machine-learned model is trained based on the training data.

12. One or more storage media storing instructions which, when executed by one or more processors, cause:
for each feature value set in a plurality of feature value sets:
 using a first machine-learned model to generate a score based on said each feature value set;
 generating a training instance based on said each feature value set;
 modifying an attribute of the training instance based on the score to generate a modified training instance;
 adding the modified training instance to training data;
using one or more machine learning techniques to train a second machine-learned model based on the training data.

13. The one or more storage media of claim 12, wherein modifying the attribute of the training instance comprises modifying a weight of the training instance based on the score, wherein the weight of the training instance affects how much one of the one or more machine learning techniques modifies one or more coefficients of the second machine-learned model.

14. The one or more storage media of claim 12, wherein modifying the attribute of the training instance comprises:
identifying a label of the training instance;
determining whether the label is a positive label or a negative label;
in response to determining that the label is a positive label, replacing an attribute value of the attribute with a summation of the score and a positive value.

15. The one or more storage media of claim 12, wherein modifying the attribute of the training instance comprises:
identifying a label of the training instance;
determining whether the label is a positive label or a negative label;
in response to determining that the label is a negative label, replacing an attribute value of the attribute with a product of (1) a summation of the score and a first positive value and (2) a difference between a second positive value and the score.

16. The one or more storage media of claim 12, wherein modifying the attribute of the training instance comprises:
identifying a label of the training instance;
determining whether the label is a positive label or a negative label;
if the label is a positive label, then replacing an attribute value of the attribute with a summation of the score and a positive value;
if the label is a negative label, then replacing the attribute value of the attribute with a product of (1) a summation of the score and the positive value and (2) a difference between the positive value and the score.

17. The one or more storage media of claim 12, wherein the instructions, when executed by the one or more processors, further cause:
determining that certain data is made available to a particular destination entity;
without waiting for a response from the particular destination entity and based on a first event:
 generating a particular training instance that includes a first label that indicates that the particular destination entity did not perform an action in response to the certain data;

adding the particular training instance to the training data prior to training the second machine-learned model.

18. The one or more storage media of claim 17, wherein the instructions, when executed by the one or more processors, further cause, after training the second machine-learned model:
- determining that the particular destination entity performed the action in response to the certain data;
- in response to determining that the particular destination entity performed the action in response to the certain data, updating the particular training instance to generate an updated training instance by replacing the first label with a second label that indicates that the particular destination entity performed the action in response to the certain data;
- adding the updated training instance to the training data.

19. The one or more storage media of claim 18, wherein:
the particular training instance is associated with a first weight that is based on a particular score computed by the first machine-learned model for a particular feature value set;
the updated training instance is associated with a second weight that is different than the first weight and that is based on the particular score.

20. The one or more storage media of claim 12, wherein each feature value set in the plurality of feature value sets includes a first set of feature values pertaining to one entity and a second set of feature values pertaining to another entity.

* * * * *